(12) United States Patent
Nakagawa

(10) Patent No.: US 12,470,541 B2
(45) Date of Patent: Nov. 11, 2025

(54) IMAGE FORMING APPARATUS, DISPLAY METHOD, AND RECORDING MEDIUM FOR DISPLAYING AUTHENTICATION METHOD USING EXTERNAL SERVER OR UNIQUE TO IMAGE FORMING APPARATUS

(71) Applicant: Shimpei Nakagawa, Kanagawa (JP)

(72) Inventor: Shimpei Nakagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 523 days.

(21) Appl. No.: 17/818,049

(22) Filed: Aug. 8, 2022

(65) Prior Publication Data

US 2023/0056951 A1    Feb. 23, 2023

(30) Foreign Application Priority Data

Aug. 20, 2021   (JP) .................................. 2021-135083

(51) Int. Cl.
    *H04L 9/40*       (2022.01)
    *G06F 9/445*      (2018.01)
(52) U.S. Cl.
    CPC .......... *H04L 63/083* (2013.01); *G06F 9/4451* (2013.01); *H04L 63/0884* (2013.01)
(58) Field of Classification Search
    None
    See application file for complete search history.

(56) References Cited

U.S. PATENT DOCUMENTS

| | | | |
|---|---|---|---|
| 9,001,370 B1* | 4/2015 | Nuggehalli | G06F 21/31 358/1.15 |
| 9,164,710 B2* | 10/2015 | Kondoh | G06F 21/6218 |
| 10,270,754 B2* | 4/2019 | Sato | H04L 63/08 |
| 10,484,368 B2* | 11/2019 | Hinohara | H04L 63/0807 |
| 10,645,185 B2* | 5/2020 | Baba | H04L 67/01 |
| 2005/0210293 A1 | 9/2005 | Ohtani | |
| 2010/0050247 A1* | 2/2010 | Hashimoto | H04L 9/3213 726/10 |
| 2011/0228311 A1 | 9/2011 | Oguma et al. | |

(Continued)

FOREIGN PATENT DOCUMENTS

| | | | | |
|---|---|---|---|---|
| GB | 2507725 A | * | 5/2014 | H04W 12/06 |
| JP | 2005-149256 | | 6/2005 | |

(Continued)

OTHER PUBLICATIONS

Written Opinion 2021 / 135083 (Year: 2025).*
Office Action dated Mar. 18, 2025 issued with respect to the Japanese Patent Application No. 2021-135083.

*Primary Examiner* — Eleni A Shiferaw
*Assistant Examiner* — Duilio Munguia
(74) *Attorney, Agent, or Firm* — IPUSA, PLLC

(57) ABSTRACT

An information processing apparatus includes circuitry; and a memory storing computer-executable instructions that cause the circuitry to execute communicating with an information processing system via a network to receive, from the information processing system, information relating to a setting; changing a setting of a web browser according to the received information relating to the setting; and displaying, by using the web browser, a screen for receiving an operation, upon connecting to an external server according to the received information relating to the setting.

6 Claims, 17 Drawing Sheets

(56) References Cited

U.S. PATENT DOCUMENTS

| | | | |
|---|---|---|---|
| 2012/0204234 A1* | 8/2012 | Kuroda | H04L 67/02 |
| | | | 726/4 |
| 2014/0230023 A1* | 8/2014 | Parks | H04L 63/08 |
| | | | 726/4 |
| 2014/0379917 A1* | 12/2014 | Kano | H04L 67/142 |
| | | | 709/225 |
| 2015/0146243 A1* | 5/2015 | Tsujimoto | H04N 1/4433 |
| | | | 358/1.15 |
| 2015/0188914 A1* | 7/2015 | Osawa | H04L 67/02 |
| | | | 726/5 |
| 2017/0012979 A1* | 1/2017 | Matsushita | H04L 63/102 |
| 2017/0372414 A1* | 12/2017 | Nishikawa | G06Q 40/02 |
| 2020/0244704 A1* | 7/2020 | Andrews | H04L 63/10 |
| 2021/0099599 A1 | 4/2021 | Han et al. | |

FOREIGN PATENT DOCUMENTS

| | | | |
|---|---|---|---|
| JP | 2005-267448 | | 9/2005 |
| JP | 2006-195750 | | 7/2006 |
| JP | 2006195750 A | * | 7/2006 |
| JP | 2011-192115 | | 9/2011 |
| JP | 2012063813 A | * | 3/2012 |
| JP | 2017-059149 | | 3/2017 |
| JP | 2021-056982 | | 4/2021 |

* cited by examiner

FIG.7

SETTING INFORMATION

| TYPE OF EXTERNAL SERVER | SETTING OF local storage |
|---|---|
| Nanosoft365 | ON |
| GL GL WORK SPACE | OFF |
| ... | ... |

FIG.8A

AUTHENTICATION METHOD INFORMATION

| TENANT ID | AUTHENTICATION METHOD |
|---|---|
| 001 | AUTHENTICATION BY EXTERNAL SERVER<br>・Nanosoft365 |
| 002 | E-MAIL ADDRESS/PASSWORD |
| 003 | TENANT ID/USER ID/PASSWORD |
| 004 | PIN |
| 005 | USER SELECT |
| 006 | IC CARD |
| ... | ... |

FIG.8B

| TYPE OF EXTERNAL SERVER | CONNECTION DESTINATION URL |
|---|---|
| Nanosoft365 | https://login.abconline.com/ |
| GL GL WORK SPACE | https://login.glglonline.com/ |
| ... | ... |

FIG.11

Login:User ID

Enter your user ID and password.

260

TENANT ID — Please enter — 261
User ID — Please enter — 262
Password — Please enter — 263

Login — 264

Close

Administrator login

Language English

2021/06/22
19:25

Check Status | Stop

FIG.13

IMAGE FORMING APPARATUS, DISPLAY METHOD, AND RECORDING MEDIUM FOR DISPLAYING AUTHENTICATION METHOD USING EXTERNAL SERVER OR UNIQUE TO IMAGE FORMING APPARATUS

CROSS-REFERENCE TO RELATED APPLICATION

The present application is based on and claims priority under 35 U.S.C. § 119 to Japanese Patent Application No. 2021-135083, filed on Aug. 20, 2021, the contents of which are incorporated herein by reference in their entirety.

BACKGROUND OF THE INVENTION

1. Field of the Invention

The present invention relates to an information processing apparatus, a display method, and a recording medium.

2. Description of the Related Art

When an authentication function of a device, such as an image forming apparatus, is provided inside the device, and changes are made such as customizing or upgrading the authentication function, the administrator needs to individually update each device. Thus, there are cases of using a method in which the device communicates with an information processing system on the network and the information processing system returns the authentication result to the device.

Further, a technology for switching the display content of a login screen displayed by the device is devised (see, for example, Patent Document 1). Patent Document 1 discloses a technology in which, at the time of rendering the login screen, the device acquires, from the cloud side, the setting value of a login method set by an administrator, and switches the display content of the login screen according to the acquired setting value.

Patent Document 1: Japanese Unexamined Patent Application Publication No. 2021-056982

SUMMARY OF THE INVENTION

According to one aspect of the present invention, there is provided an information processing apparatus including circuitry; and a memory storing computer-executable instructions that cause the circuitry to execute communicating with an information processing system via a network to receive, from the information processing system, information relating to a setting; changing a setting of a web browser according to the received information relating to the setting; and displaying, by using the web browser, a screen for receiving an operation, upon connecting to an external server according to the received information relating to the setting.

BRIEF DESCRIPTION OF THE DRAWINGS

FIG. 7 is a diagram illustrating an example of setting information stored in a setting information storage unit according to an embodiment of the present invention;

FIGS. 8A and 8B are diagrams illustrating an example of authentication method information stored in an authentication method storage unit and an example of a connection destination URL corresponding to an external server according to an embodiment of the present invention;

FIG. 11 is a diagram illustrating an example of a login screen displayed by a device when the authentication method is tenant ID, user ID, and password according to an embodiment of the present invention;

FIG. 13 is a diagram illustrating an example of a login screen displayed by a device when the authentication method is user select (i.e., a user-based selection) according to an embodiment of the present invention;

FIG. 17 is a flowchart illustrating an example of a process in which a setting changing unit switches the setting of local storage to ON.

DESCRIPTION OF THE EMBODIMENTS

In the conventional technology, there has been an problem in that a screen for receiving an operation from a user cannot be displayed in some cases. For example, depending on the operating system (OS) installed in the device, the setting of a local storage (a function for storing data in a web browser) is set as OFF by default. However, when an attempt is made to display a particular screen on the device, it may not be possible to display this screen unless the setting of the local storage is set as ON. If the device cannot display the particular screen, the user may not be able to continue an operation.

A problem to be addressed by an embodiment of the present invention is to provide an information processing apparatus capable of displaying a screen for receiving an operation from a user.

Hereinafter, as an example of an embodiment of the present invention, a device and a display method performed by the device will be described with reference to the drawings.

<Inconvenience of Login Screen Caused by Setting of Local Storage>

There are cases where a device is equipped with an operating system referred to as Android (registered trademark). Android has a module referred to as WebView. WebView is a module used for creating an Android application and for displaying web content in an application. WebView is embedded in, for example, a web browser function.

In WebView, the setting of the local storage is set as OFF by default. When the setting of the local storage is set as ON, the web browser can store data, but when the setting of the local storage is set as OFF, the web browser cannot store the data. When an attempt is made to display a particular screen for authentication provided by an external server, depending on the external server, it may not be possible to display this particular screen by WebView unless the usage of local storage is set as ON. In this case, the device will display a blank screen or an error message, and thus the device cannot display the particular screen. This inconvenience will be described in detail with reference to FIG. 1.

Figure 1:
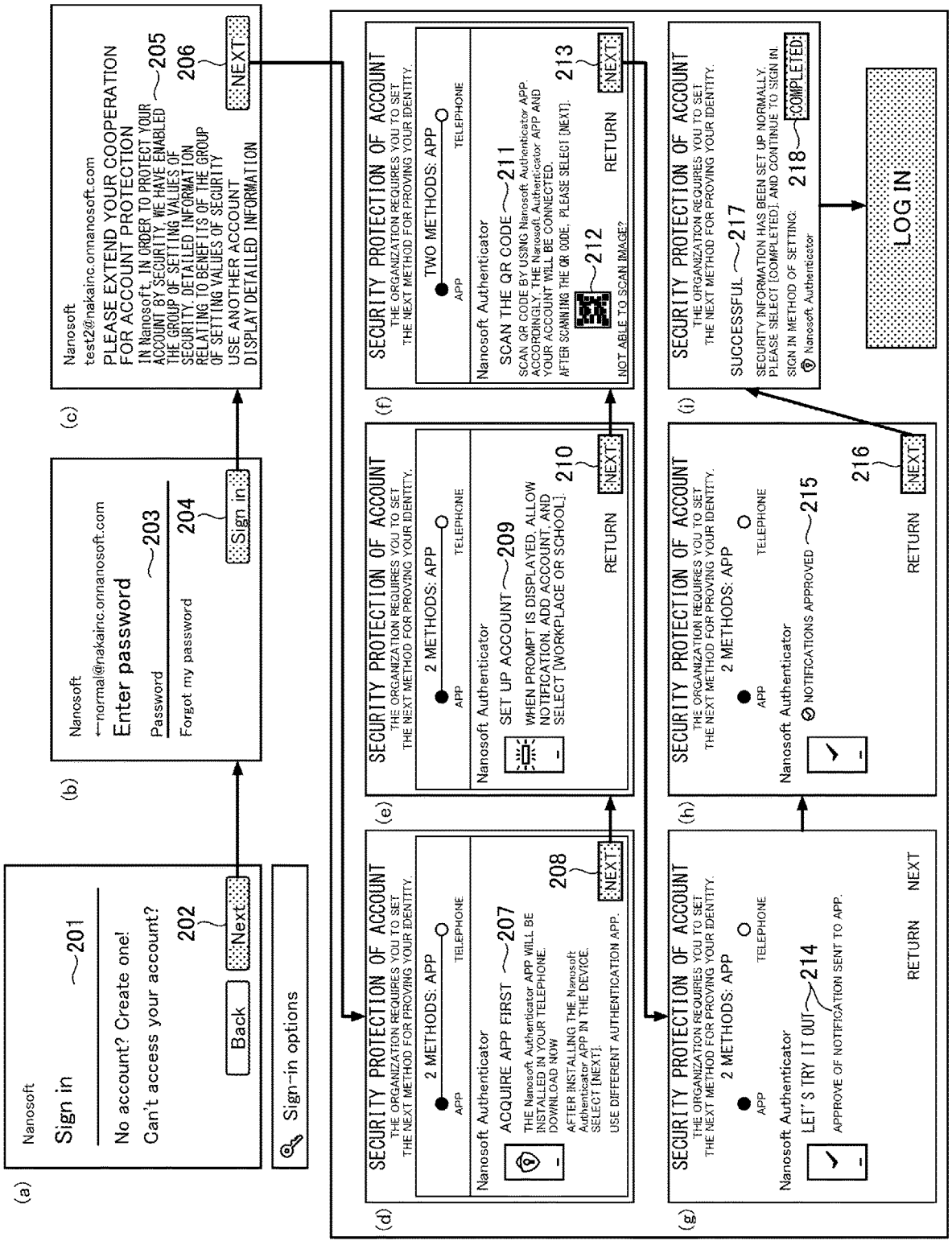
FIG. 1 is a diagram illustrating the problem of a login screen caused by the setting of local storage.

FIG. 1 is a diagram illustrating the inconvenience in a login screen, caused by the setting of the local storage. In some external servers, it is possible to make a setting of Multi-Factor Authentication (MFA), for the purpose of enhancing security. MFA authentication is an authentication method that requires the confirmation of additional information when a user attempts to log in, in addition to the e-mail address and password of the user. Examples of the additional information are information that cannot be easily copied, such as an object possessed by the user (e.g., a smartphone) or a biological characteristic unique to the user (e.g., fingerprint).

FIG. 1 illustrates the flow of MFA authentication by screen transition. The screens illustrated in FIG. 1 are assumed to be displayed on a general-purpose information processing apparatus possessed by a user. FIG. 1 illustrates the screen transition displayed when the MFA authentication setting is enabled and the user attempts to log in to an external server in a state where the login user's MFA information is not registered. Therefore, the user registers MFA information in the course of the login process.

First, in FIG. 1, (a) to (c) are regular login screens that are displayed regardless of MFA authentication. The screen (a) in FIG. 1 includes a user ID field 201. By pressing a next button 202 in the screen (a) in FIG. 1, the screen (a) in FIG. 1 transitions to the screen (b) in FIG. 1.

The screen (b) in FIG. 1 includes a password field 203. By pressing a sign in button 204 in the screen (b) in FIG. 1, the screen (b) in FIG. 1 transitions to the screen (c) in FIG. 1.

The screen (c) in FIG. 1 is displayed when the MFA authentication is enabled, and indicates that MFA authentication will start by a message 205 reading "Please extend your cooperation for account protection". By pressing a next button 206 in the screen (c) in FIG. 1, the screen (c) in FIG. 1 transitions to the screen (d) in FIG. 1.

The screen (d) in FIG. 1 includes a message 207 reading "Acquire app first", prompting the user to download the application for MFA authentication. By pressing a next button 208 in the screen (d) in FIG. 1, the screen (d) in FIG. 1 transitions to the screen (e) in FIG. 1.

The screen (e) in FIG. 1 includes a message 209 reading "set up account", and an explanation of how to set the MFA authentication. By pressing a next button 210 in the screen (e) in FIG. 1, the screen (e) in FIG. 1 transitions to the screen (f) in FIG. 1.

The screen (f) in FIG. 1 includes a message 211 reading "Scan the QR Code (registered trademark)" and a QR code 212, and an explanation that the user's account will be associated with the application. By pressing a next button 213 in the screen (f) in FIG. 1, the screen (f) in FIG. 1 transitions to the screen (g) in FIG. 1.

The screen (g) in FIG. 1 includes a message 214 reading "Let's try it out" and an explanation of prompting an operation of approving of having notifications sent to the application "Approve of notification sent to application". By performing an approval operation with respect to the application installed in the information processing apparatus, the screen (g) in FIG. 1 transitions to the screen (h) in FIG. 1.

The screen (h) in FIG. 1 includes a message 215 reading "Notifications approved" and an explanation that it has been confirmed that the user has approved of notifications. By pressing a next button 216 in the screen (h) in FIG. 1, the screen (h) in FIG. 1 transitions to the screen (i) in FIG. 1.

The screen (i) in FIG. 1 includes a message 217 reading "Successful" and an explanation that the MFA information has been registered. By pressing a completed button 218, the login is completed.

However, with respect to the screens (d) to (i) in FIG. 1, the setting of the local storage of the web browser (in the present embodiment, WebView) for displaying these screens, needs to be set as ON. This is relevant to the specification of the external server. However, in WebView, the setting of the local storage is set to OFF by default, and, therefore, even when the authentication application operating on the device attempts to display the screens (d) to (i) of FIG. 1 by using WebView, the authentication application has not been able to display these screens.

<Outline of Operation>

Therefore, a device usage system according to the present embodiment operates as follows.

(i) A device such as an image forming apparatus acquires an authentication method (an example of information relating to a setting) that has been set in the information processing system by the tenant administrator.

(ii) If the authentication method is "authentication by external server", the device sets the setting of the local storage to ON.

This allows the device to display a particular screen for authentication (for example, the screens (d) to (i) in FIG. 1). Further, the number of authentication methods supported by the device can be increased, thereby enabling authentication by using an authentication method that the user wishes to use.

Terminology

Authentication refers to the determination of whether a user has valid authority. In the present embodiment, authentication is determining whether the user has the authority to use the device. When the authentication is successful, the user logs in to the device. Login refers to an authentication activity of accessing a system's resources by using the account information stored in advance, when using various services in a computer or on the Internet. Account information includes a user ID and a password, an integrated circuit (IC) card number, biometric information, and the like. In some cases, a login is referred to as sign in.

A login screen is a screen in which the user inputs this account information. The login screen may be referred to as a sign in screen or an authentication screen.

The setting of a web browser is the setting of the function of the web browser for storing data. As a function of the web browser for storing data, in the present embodiment, local storage is used as an example. The function of the web browser for storing data may be cookies.

Information relating to a setting can be any setting that affects the setting of the web browser. In the present embodiment, an authentication method will be described as an example of the information relating to a setting. However, the information relating to a setting may merely be information indicating whether to use an external server or may be the setting of a web browser itself.

The authentication method refers to the type of account information used for authentication and the associated method of processing the account information. In the present embodiment, for example, "e-mail address and password", "tenant ID, user ID, and password", "IC card", and "Personal Identification Number (PIN)" are account information.

An administrator is a system administrator, etc., on the customer side who uses an information processing system 10, and is a person who makes settings relating to the communication system for a general user. A user is a general user on the customer side. The general user may perform the work of the administrator, and, therefore, it is not necessary to distinguish between the general user and the administrator.

<Example of System Configuration>

Figure 2:
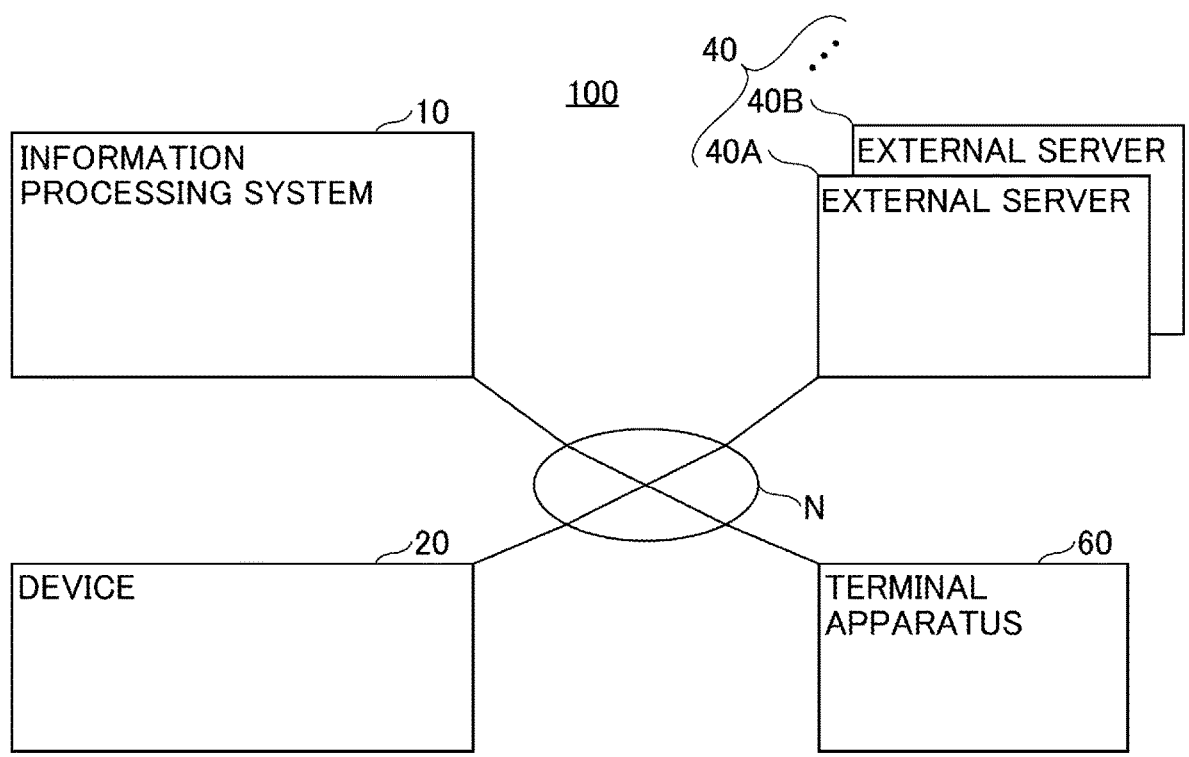
FIG. 2 is a diagram illustrating an example of a system configuration of a device usage system according to an embodiment of the present invention.

Referring to FIG. 2, a system configuration of a device usage system 100 according to the present embodiment will be described. FIG. 2 is a diagram illustrating an example of a system configuration of the device usage system 100 according to the present embodiment.

The device usage system 100 illustrated in FIG. 2 includes an information processing system 10 and a device 20, which are communicatively connected via a wide area network N such as the Internet. The information processing system 10 may also communicate with various external servers 40 and a terminal apparatus 60.

The information processing system 10 is implemented by one or more information processing apparatuses and provides various services to users via the network N, alone or in cooperation with the external server 40. The information processing system 10 according to the present embodiment provides various services including, for example, workflow services that perform a series of processes such as scanning a document, Optical Character Recognition (OCR) of image data, uploading a file, and the like. An example of a service is pull printing in which a file is downloaded from a storage service and printed by the device. In addition, the information processing system 10 may provide various services by using the device 20.

The information processing system 10 has the function of authenticating a user using the device 20. The user may be authenticated by the information processing system 10 or may be authenticated by the external server 40. The administrator can set which of these apparatuses are to be used to implement the authentication in advance (included in the authentication method setting).

The information processing system 10 may be implemented by cloud computing or by a single information processing apparatus. Cloud computing is a form in which resources on a network are used without considering specific hardware resources. The information processing system 10 may be present on the Internet or on-premise.

The device 20 may be various electronic devices (an example of an information processing apparatus) used by the user. The device 20 may be, for example, an image forming apparatus such as a Multifunction Peripheral (MFP), a projector, an electronic blackboard, a video conference terminal, a digital camera, or the like. Further, the device 20 may be any relevant device that has the function of a web browser or a function equivalent to a web browser. The device 20 can communicate with the information processing system 10 or the external server 40 via the network N. The user may use the device 20 to use various services provided by the information processing system 10 or the external server 40.

A plurality of the external servers 40 may be present depending on the function. The term "external" refers to a server that is separate from the information processing system 10. For example, the management entity of a service in the external server 40 may be different from that of the information processing system 10. When distinguishing the respective external servers 40, the external servers 40 are described as an external server 40A, an external server 40B, and the like, but when referring to any one of the external servers 40, this is simply described as the "external server 40". The external server 40 is one or more information processing apparatuses.

Each of the external servers 40 has the function of authenticating a user. The external server 40 corresponds to, for example, OAuth. OAuth is a mechanism for operating multiple web services in cooperation with each other. Usually, in order for the user to use a web service, it is necessary to input a user ID and a password individually to each web service. However, using OAuth enables linkage between web services (the information processing system 10 and the external server 40) without having the user input the ID and password individually for each web service. When OAuth is used, the external server 40 authenticates the user of the device 20 in response to an authentication request from the information processing system 10.

The terminal apparatus 60 is a general purpose information processing apparatus that communicates with the information processing system 10. A web browser operates in the terminal apparatus 60 to display various kinds of screens based on the screen information received from the information processing system 10. The administrator can set, for example, an authentication method from the screen.

The terminal apparatus 60 is, for example, a Personal Computer (PC), a smartphone, a tablet terminal, a Personal Digital Assistant (PDA), or the like, and may be any relevant apparatus as long as a web browser can be operated thereon. In the terminal apparatus 60, the application is not limited to a web browser, and an application exclusively used for the information processing system 10 may be operated.

<Example Hardware Configuration>

Figure 3:
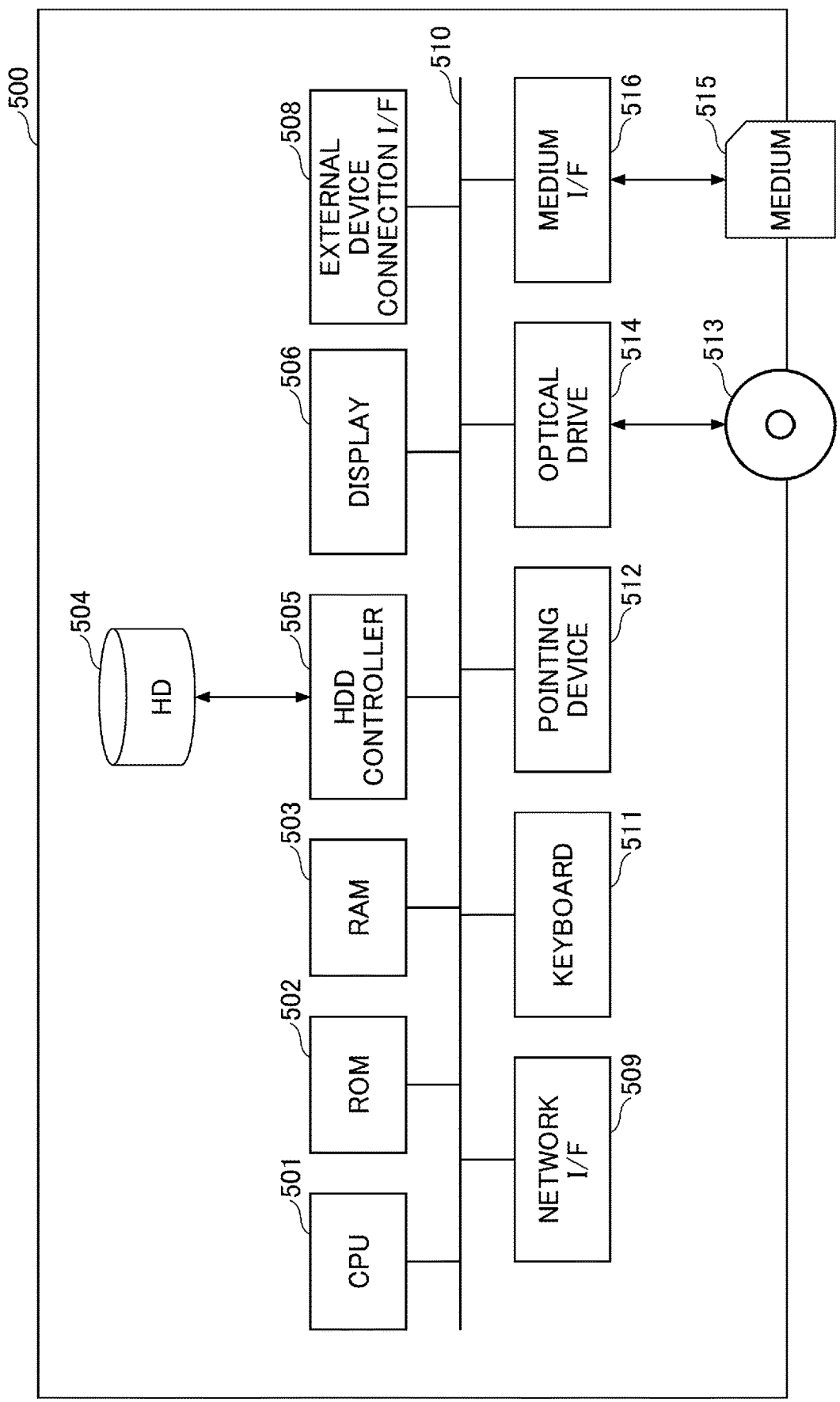
FIG. 3 is a diagram illustrating an example of a hardware configuration of an information processing system and a terminal apparatus according to an embodiment of the present invention.
Figure 4:
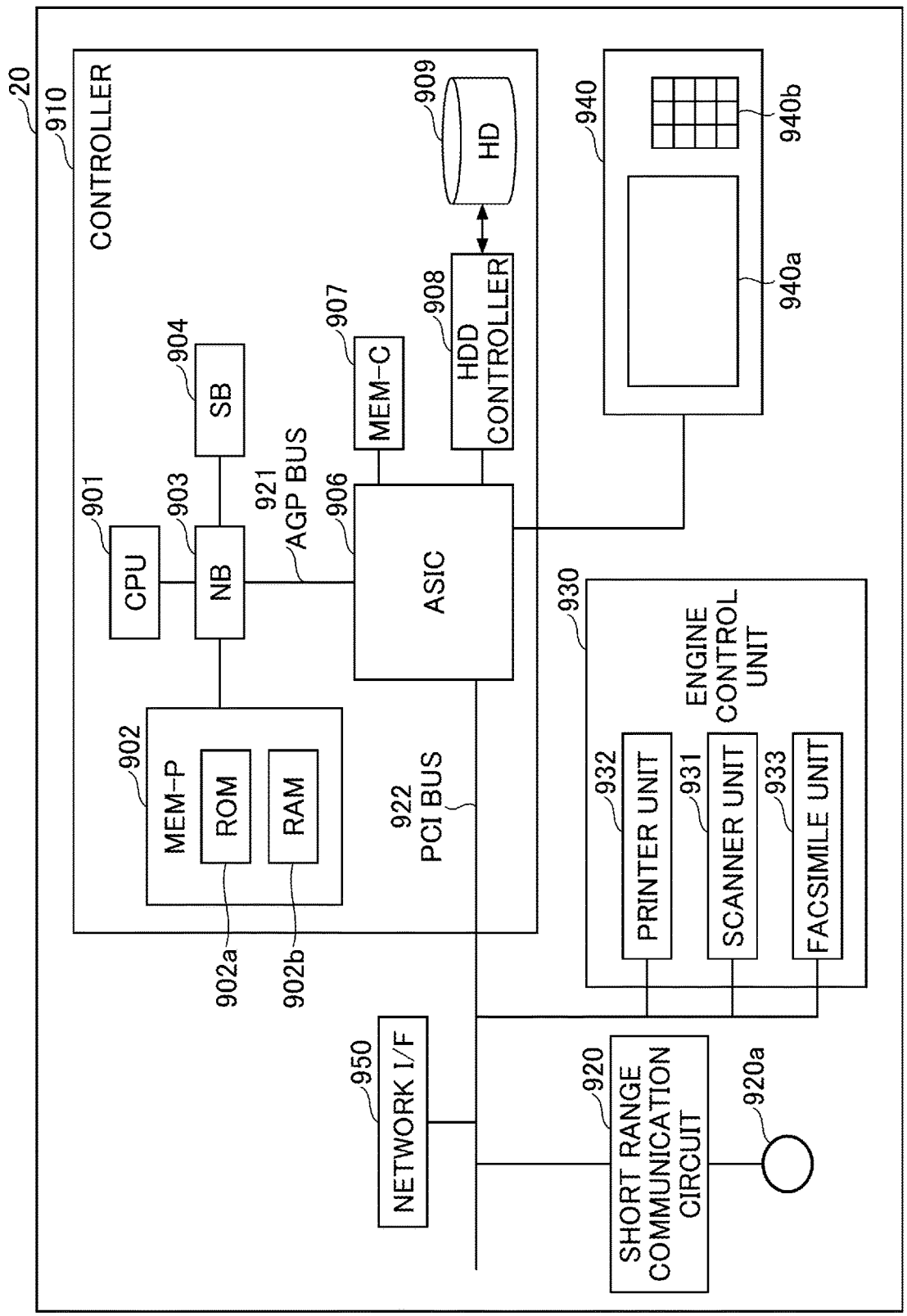
FIG. 4 is a diagram illustrating an example of a hardware configuration of an image forming apparatus as an example of a device according to an embodiment of the present invention.

Referring to FIGS. 3 and 4, the hardware configuration of the information processing system 10 and the device 20 included in the device usage system 100 according to the present embodiment will be described.

<<Information Processing System, Terminal Apparatus>>

FIG. 3 is a diagram illustrating an example of hardware configuration of the information processing system 10 and the terminal apparatus 60 according to the present embodiment. The hardware configuration of the external server 40 may be the same as that in FIG. 3, or may be different, but the description of the present embodiment will not be affected either way.

As illustrated in FIG. 3, the information processing system 10 and the terminal apparatus 60 are each constructed by a computer 500. The computer 500 includes a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, an optical drive 514, and a medium I/F 516.

Among these, the CPU 501 controls the operation of the entire computer 500. The ROM 502 stores a program used to drive the CPU 501, such as an initial program loader (IPL). The RAM 503 is used as the work area of the CPU 501. The HD 504 stores various kinds of data such as a program. The HDD controller 505 controls the reading or writing of various data from and to the HD 504 according to the control of the CPU 501. The display 506 displays various kinds of information such as cursors, menus, windows, characters, or images. The external device connection I/F 508 is an interface for connecting various external devices. In this case, the external device may be, for example, a Universal Serial Bus (USB) memory or a printer. The network I/F 509 is an interface for performing data communication by using the network N. The bus line 510 is an address bus, a data bus, or the like for electrically connecting elements such as the CPU 501 illustrated in FIG. 3.

Further, the keyboard 511 is a type of input means including a plurality of keys used for inputting information such as characters, numbers, or various instructions. The pointing device 512 is a type of input means for selecting and executing various instructions, selecting a processing target, moving a cursor, and the like. The optical drive 514 controls the reading or writing of various data from and to an optical storage medium 513 as an example of a removable recording medium. The optical storage medium is a compact disc (CD), a Digital Versatile Disc (DVD), a Blu-Ray (registered trademark), and the like. The medium I/F 516 controls the reading or writing (storage) of data from or to a recording medium 515, such as a flash memory.

<<Device>>

FIG. 4 is a hardware configuration diagram illustrating an image forming apparatus that is an example of the device 20. As illustrated in FIG. 4, the image forming apparatus includes a controller 910, a short range communication circuit 920, an engine control unit 930, an operation panel 940, and a network I/F 950.

Among these, the controller 910 includes a CPU 901, a system memory (MEM-P) 902, a northbridge (NB) 903, a south bridge (SB) 904, an ASIC (Application Specific Integrated Circuit) 906, a local memory (MEM-C) 907 that is a storage unit, a HDD controller 908, and a HD 909 that is a storage unit, that are main portions of a computer, and the NB 903 and the ASIC 906 are connected by an AGP (Accelerated Graphics Port) bus 921.

Among these, the CPU 901 is a control unit that performs overall control of the image forming apparatus. The NB 903 is a bridge for connecting the CPU 901 to the MEM-P 902, the SB 904, and the AGP bus 921, and the NB 903 has a memory controller for controlling the reading and writing of data from and to the MEM-P 902, a PCI (Peripheral Component Interconnect) master, and an AGP target.

The MEM-P 902 includes the ROM 902*a*, which is a memory for storing programs and data for implementing each function of the controller 910, and the RAM 902*b*, which is used for loading programs and data and is used as a rendering memory for memory printing. The program stored in the RAM 902*b* may be provided upon being recorded in a computer-readable recording medium such as a compact disc read-only memory (CD-ROM), a CD recordable (CD-R), or a digital versatile disc (DVD) in a file in an installable format or an executable format.

The SB 904 is a bridge for connecting the NB 903 to PCI devices and peripheral devices. The ASIC 906 is an integrated circuit (IC) for image processing applications having hardware elements for image processing, and serves as a bridge connecting the AGP bus 921, the PCI bus 922, the HDD controller 908, and the MEM-C 907, respectively. The ASIC 906 includes a PCI target and an AGP master, an arbiter (ARB) that forms the core of the ASIC 906, a memory controller that controls the MEM-C 907, a plurality of Direct Memory Access Controllers (DMACs) that rotate image data by hardware logic or the like, and a PCI unit that transfers data between a scanner unit 931, a printer unit 932, and a facsimile unit through the PCI bus 922. The ASIC 906 may have an interface of the USB (Universal Serial Bus) or the IEEE 1394 (Institute of Electronic and Electronic Engineers 1394).

The MEM-C 907 is a local memory used as an image buffer and a code buffer for copying. The HD 909 is a storage for storing image data, storing font data used for printing, and storing forms. The HD 909 controls the reading or writing of data from or to the HD 909 according to the control of the CPU 901. The AGP bus 921 is a bus interface for graphics accelerator cards proposed to speed up graphics processing, and can speed up graphics accelerator cards by directly accessing the MEM-P 902 with high throughput.

The short range communication circuit 920 is provided with an antenna 920*a* of the short range communication circuit. The short range communication circuit 920 is a communication circuit of, for example, an NFC, Bluetooth (registered trademark), or the like.

The engine control unit 930 further includes a scanner unit 931, a printer unit 932, and a facsimile unit 933. The operation panel 940 includes a panel display unit 940*a*, such as a touch panel, for displaying a current setting value, a selection screen, or the like, and receiving input from an operator, and the operation panel 940 includes hard keys 940*b*, such as a numeric pad, for receiving a setting value of an image forming condition, such as a density setting condition, and a start key for receiving a copy start instruction. The controller 910 controls the entire image forming apparatus and controls, for example, rendering, communication, input from the operation panel 940, and the like. The scanner unit 931 or the printer unit 932 includes an image processing unit for performing image processing such as error diffusion or gamma conversion.

In the image forming apparatus, the application switching key of the operation panel 940 allows sequential switching of the document box function, the copy function, the printer function, and the fax function, so that one of these functions can be selected. When the document box function is selected by the user, the document box mode is set, when the copy function is selected by the user, the copy mode is set, when the printer function is selected by the user, the printer mode is set, and when the fax function is selected by the user, the fax mode is set.

The network I/F 950 is an interface for performing data communication using the communication network N. The short range communication circuit 920 and the network I/F 950 are electrically connected to the ASIC 906 via a PCI bus 922.

<Software Configuration>

Figure 5:
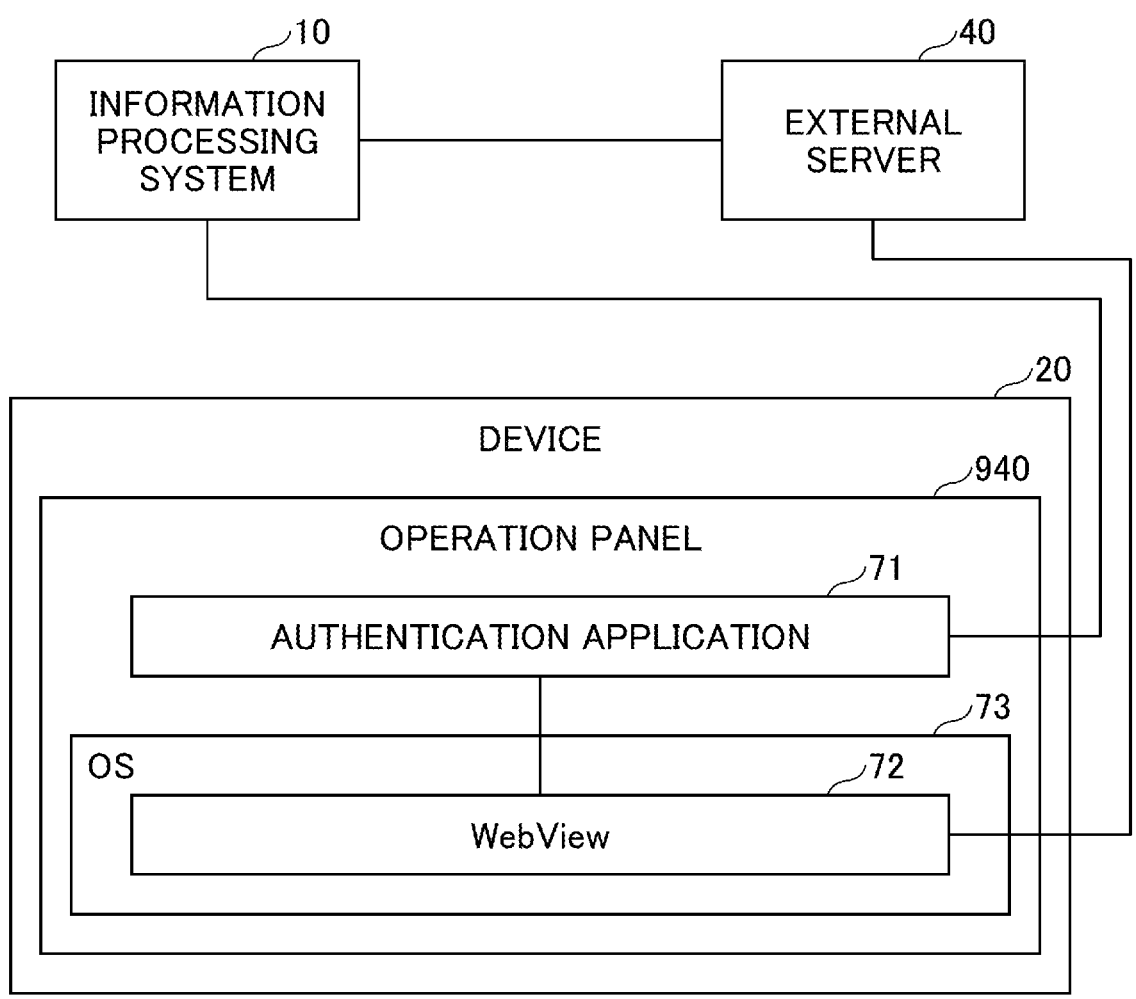
FIG. 5 is a diagram illustrating an example of a configuration of software included in a device according to an embodiment of the present invention.

FIG. 5 illustrates a configuration diagram of the software of the device 20. As illustrated in FIG. 5, the device 20 includes an authentication application 71 operating on the operation panel 940. The authentication application 71 operates on an operating system (OS) 73. The OS 73 includes a WebView 72 described above. The WebView 72 is a module for displaying web pages in Android applications as described above.

The authentication application 71 communicates with the information processing system and the WebView 72 communicates with the external server 40. When the authentication method acquired by the device 20 from the information processing system 10 is set as "cooperation with an external service", the authentication application 71 displays a login screen provided by the external server 40 via the WebView 72. When the user logs in to the information processing system 10 via authentication by the external server 40, the user can use the function of copying/printing and the like provided by the device 20 after logging in and the function of uploading a file and the like provided by the information processing system 10.

The authentication application 71 is an application referred to as a native application. A native application is an application that is executed after being installed in a terminal. An application that operates on a web browser without being installed is referred to as a web application. Therefore, the WebView 72 can implement a web applications.

As the OS 73, for example, an operating system such as Android (registered trademark) can be assumed, but is not limited thereto. The OS 73 may be, for example, Windows (registered trademark), iOS (registered trademark), Linux (registered trademark), MAC (registered trademark), Chrome (registered trademark), etc.

If the authentication method set by the administrator is other than "authentication by external server", the authentication application 71 displays a login screen by using a display component that is retained in advance.

The user can log in to the device 20, in either a login screen that the authentication application 71 displays without using WebView, or a login screen that the authentication application 71 displays by using WebView.

<Functions>

Figure 6:
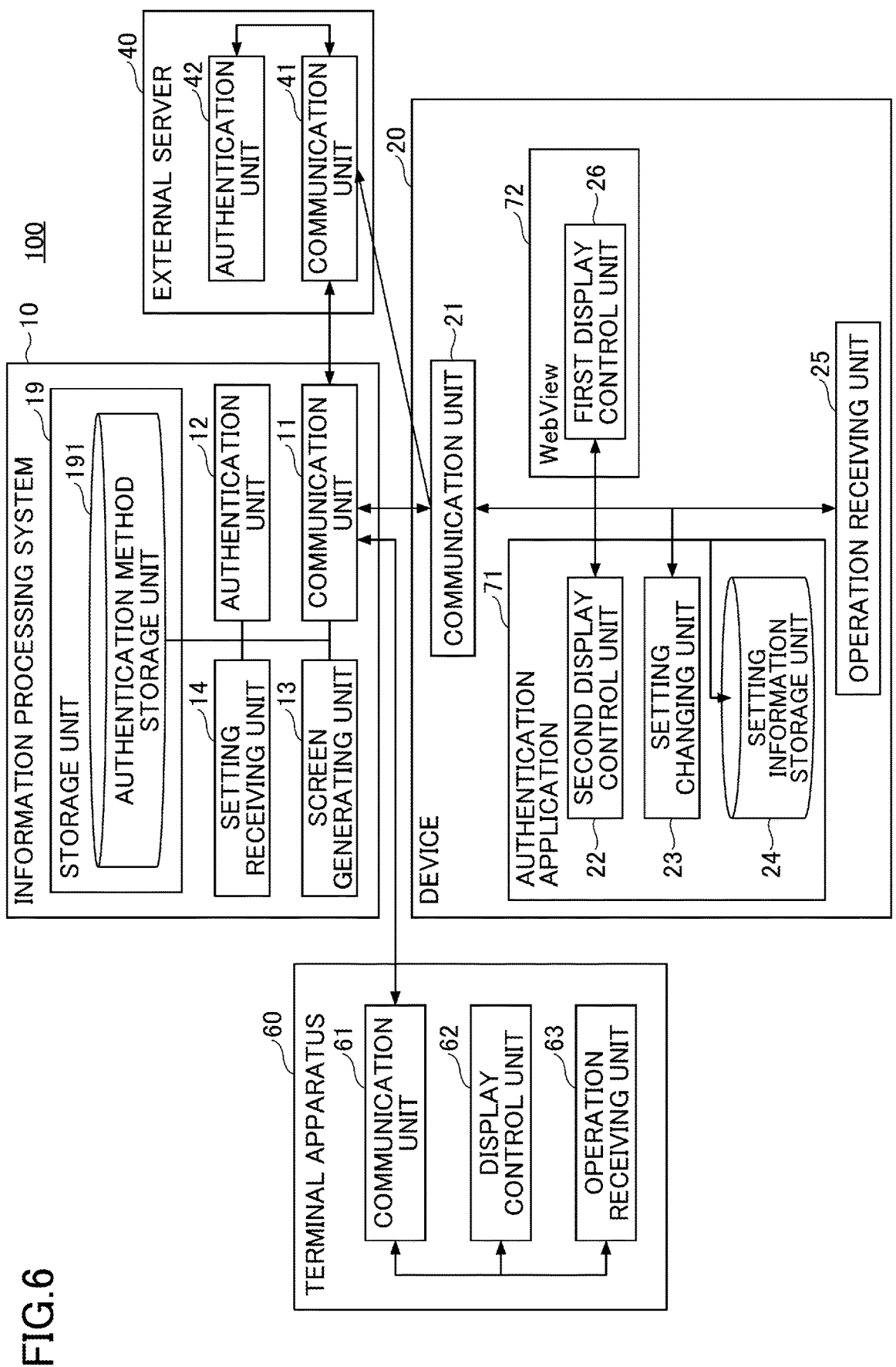
FIG. 6 is a diagram illustrating an example of a functional configuration of a device usage system according to an embodiment of the present invention.

Next, a functional configuration of the device usage system 100 according to the present embodiment will be described with reference to FIG. 6. FIG. 6 is a diagram illustrating an example of a functional configuration of the device usage system 100 according to the present embodiment.

<<Device>>

The device 20 includes a communication unit 21, a second display control unit 22, a setting changing unit 23, a setting information storage unit 24, an operation receiving unit 25, and a first display control unit 26. Each of these functional units of the device 20 is a function or means which is implemented by the CPU 901 by executing instructions included in one or more programs installed in the device 20. The following description is given on the assumption that the second display control unit 22 and the setting changing unit 23 are implemented by the authentication application 71, and the first display control unit 26 is implemented by the WebView 72.

The communication unit 21 transmits and receives various kinds of information to and from the information processing system 10 or the external server 40. According to the present embodiment, the communication unit 21 transmits an authentication request to the information processing system 10. When the authentication method is "authentication by external server", the communication unit 21 redirects to the external server 40 and performs communication relating to the authentication.

The second display control unit 22 displays a login screen on the panel display unit 940a by using a display component which is retained in advance. When the authentication method is "authentication by the external server", the second display control unit 22 combines a web page rendered by the WebView 72 with the display component and displays the login screen.

The setting changing unit 23 changes the setting of the local storage from OFF to ON according to the authentication method received from the information processing system 10. The default setting for local storage (immediately after WebView is activated) is OFF.

The operation receiving unit 25 receives various operations by a user in various screens displayed on the panel display unit 940a.

The first display control unit 26 interprets and renders screen information, such as the screen information of a login screen transmitted from the external server 40. The content of the web page rendered by the first display control unit 26 (in the present embodiment, mainly information for authentication) is transferred to the second display control unit 22, and the second display control unit 22 displays the content on the panel display unit 940a. Screen information is a program described in Hyper Text Markup Language (HTML), eXtensible Markup Language (XML), scripting language, cascade style sheets (CSS), and the like. The structure of the web page is mainly defined by HTML, the operation of the web page is defined by the scripting language, and the style of the web page is defined by CSS.

The device 20 includes the setting information storage unit 24 implemented by the HD 909 or the like. The setting information storage unit 24 stores the setting of the local storage corresponding to the type of the external server 40.

FIG. 7 illustrates the setting information stored in the setting information storage unit 24. The type of the external server 40 and the setting of the local storage (ON/OFF) are registered in the setting information. Although the appropriate setting of the local storage for displaying a login screen differs depending on the external server 40, the device 20 can display a login screen because the device 20 sets the local storage to ON in accordance with the setting information.

The information processing system 10 may include the setting information illustrated in FIG. 7. In this case, the information processing system 10 can transmit the setting of the local storage (ON or OFF) in addition to the authentication method to the device 20. In this case, there is no need for each of the devices 20 to include the setting information, and, therefore, maintenance can be facilitated.

<<Information Processing System>>

Referring back to FIG. 6, an explanation will be given. The information processing system 10 includes a communication unit 11, an authentication unit 12, a screen generating unit 13, and a setting receiving unit 14. Each of the functional units of the information processing system 10 is a function or means that is implemented by the CPU 501 by executing instructions included in one or more programs installed in the information processing system 10.

The communication unit 11 transmits and receives various kinds of information to and from the device 20 and the external server 40. According to the present embodiment, the communication unit 11 receives the authentication request together with the account information from the device 20. If the authentication method is "authentication by external server", the communication unit 11 transmits, to the device 20, information for redirecting the device 20 to the external server 40.

When the authentication method is other than "authentication by the external server", the authentication unit 12 compares the account information ("e-mail address and password", "tenant ID, user ID, and password", "IC card", "PIN (Personal Identification Number)") transmitted by the device 20 with the account information set in advance, and authenticates the user.

The screen generating unit 13 generates screen information of various settings to be displayed by the terminal apparatus 60. The setting receiving unit 14 stores the setting related to the authentication method transmitted from the terminal apparatus 60, in an authentication method storage unit 191 in a storage unit 19.

The information processing system 10 includes the authentication method storage unit 191 implemented by the HD 504 or the like. The authentication method storage unit 191 stores the authentication method for each tenant.

FIG. 8A illustrates the authentication method information stored in the authentication method storage unit 191. In the authentication method information, an authentication method is registered in association with a tenant ID. A tenant is a company, an organization, or the like, that has made a contract to receive services from a service provider (in the present embodiment, the information processing system 10). The user belongs to a tenant as an example, but the user may personally subscribe to the service. A tenant ID is identification information of a tenant. The device 20 is registered to a tenant, and when the device 20 transmits the device ID to the information processing system 10, the tenant to which the device 20 belongs is identified.

The authentication method indicates which information is to be used by the information processing system 10, in order to authenticate the user. The authentication methods include, for example, authentication by external server, e-mail address and password; tenant ID, user ID, and password; PIN; user select (i.e., a user-based selection); or an IC card.

When "authentication by external server" is set, the information processing system 10 redirects the device 20 to the external server 40 and the external server 40 authenticates the user.

When e-mail address and password are set, the information processing system 10 authenticates the user with the e-mail address and password.

When tenant ID, user ID, and password are set, the information processing system 10 authenticates the user with the tenant ID, user ID, and password.

When the IC card is set, the information processing system 10 authenticates the user with the card number stored in the IC card.

When PIN is set, the information processing system 10 authenticates the user with PIN.

When user select (i.e., a user-based selection) is set, the user can select another user with the device 20. The user logs in with the account information of this other user.

The authentication method as illustrated in FIG. 8A can be set in advance by an administrator from the authentication method setting screen, which will be described later.

FIG. 8B illustrates a connection destination URL according to the external server 40. The connection destination URL is a URL to which the device 20 connects to receive authentication from the external server 40. If the authentication method is "authentication by external server", the information processing system 10 transmits the connection destination URL to the device 20 in addition to the authentication method, so that the device 20 can connect to the external server 40.

<<External Server>>

Referring back to FIG. 6, an explanation will be given. The external server 40 includes a communication unit 41 and an authentication unit 42. Each of these functions provided by the external server 40 is a function or means implemented by CPU 501 by executing instructions included in one or more programs installed in the external server 40.

The communication unit 41 transmits and receives various kinds of information to and from the device 20 and the information processing system 10. In the present embodiment, the communication unit 41 receives the account information or the like (the user's ID and password and the like in the external server 40) from the device 20 and transmits an access) token or the like.

The authentication unit 42 authenticates the user based on the OAUTH mechanism. Further, it is assumed that the account information (user ID, password, etc.) of the user in the external server 40 is set in advance in the external server 40.

<<Terminal Apparatus>>

The terminal apparatus 60 includes a communication unit 61, a display control unit 62, and an operation receiving unit 63. Each of these functional units is a function or means implemented by the CPU 501 illustrated in FIG. 3 by executing instructions included in one or more programs installed in the computer 500. The program can be a web browser or exclusive-use software.

The communication unit 61 transmits and receives various kinds of information to and from the information processing system 10. According to the present embodiment, various kinds of screen information or the like are received from the information processing system 10, and information set by a user is transmitted to the information processing system 10.

The display control unit 62 interprets the screen information of various screens and displays the screens on the display 506. The operation receiving unit 63 receives various operations by a user in various screens displayed on the display 506.

<Examples of Screens>

Figure 9:
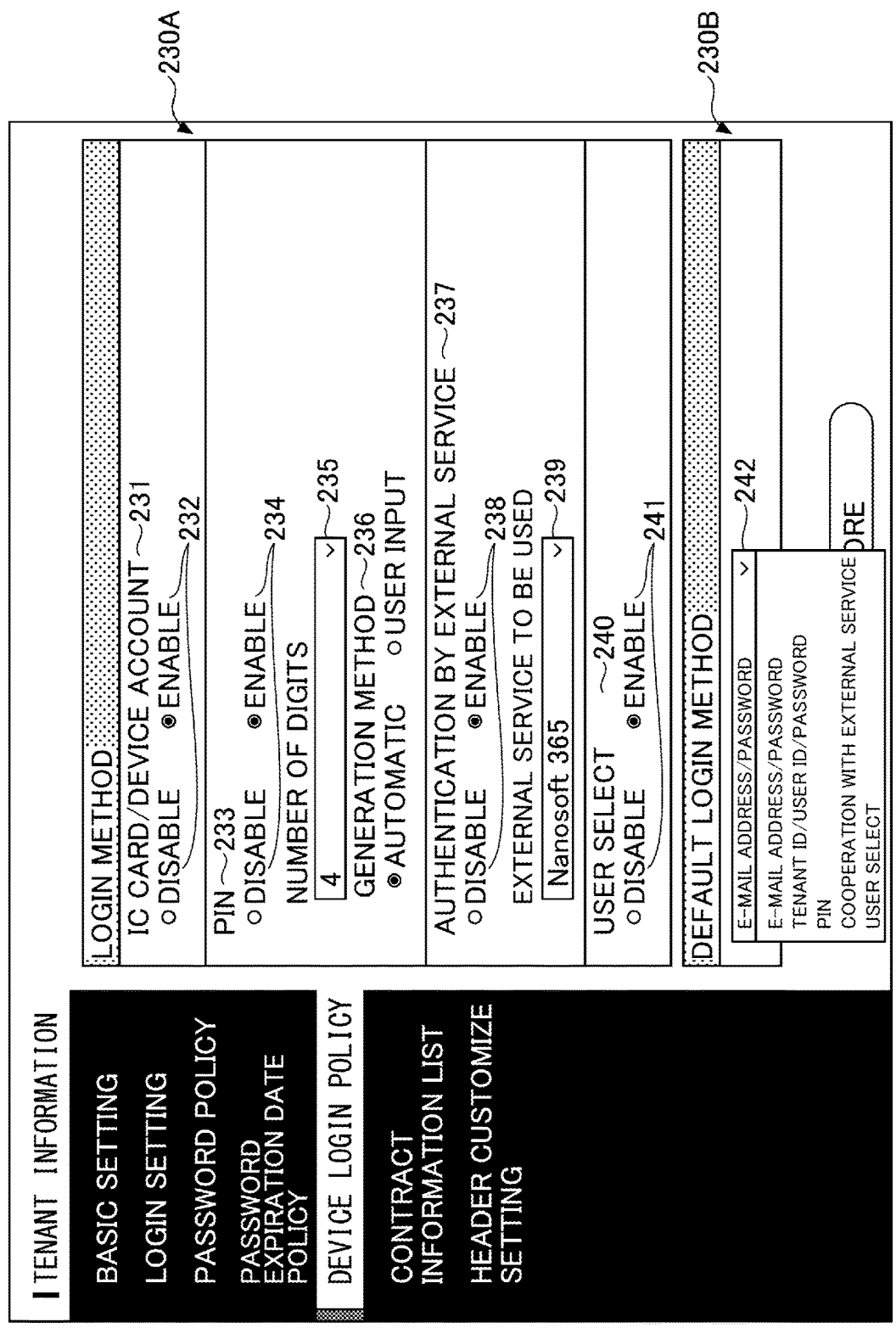
FIG. 9 is a diagram illustrating an example of an authentication method setting screen displayed by a terminal apparatus according to an embodiment of the present invention.

First, an authentication method setting screen 230 displayed by the terminal apparatus 60 will be described with reference to FIG. 9. FIG. 9 is an example of the authentication method setting screen 230. The administrator can set the authentication method for a tenant by connecting the terminal apparatus 60 to the information processing system 10 and logging in. Hereinafter, each item of the authentication method setting screen 230 will be described.

In an enabled method setting field 230A, the authentication method that the administrator wishes to enable in the tenant is set. With respect to e-mail address and password; and tenant ID, user ID, and password, the administrator cannot disable these items, and, therefore, these items are not displayed in the enabled method setting field 230A.

As illustrated in FIG. 9, the authentication methods that can be enabled include an IC card/device account 231, a PIN 233, an authentication by external service 237, and a user select 240 (i.e., a user-based selection). Radio buttons 232, 234, 238, and 241 for setting either enabled or disabled, are provided for the IC card 231, the PIN 233, the authentication by external service 237, and the user select 240, respectively.

Further, with respect to the PIN 233, there are a digit number setting field 235 and a generation method selection field 236. With respect to the authentication by external service 237, there is an external service type setting field 239. The administrator can select the type of the external server 40 from a pull-down menu.

An authentication method field 230B displays, in a pull-down menu 242, the authentication method that is set as enabled in the enabled method setting field 230A. The authentication method set by the administrator in the authentication method field 230B is stored in the authentication method storage unit 191.

Next, a login screen displayed by the device 20 according to the authentication method will be described with reference to FIGS. 10 to 14.

Figure 10:
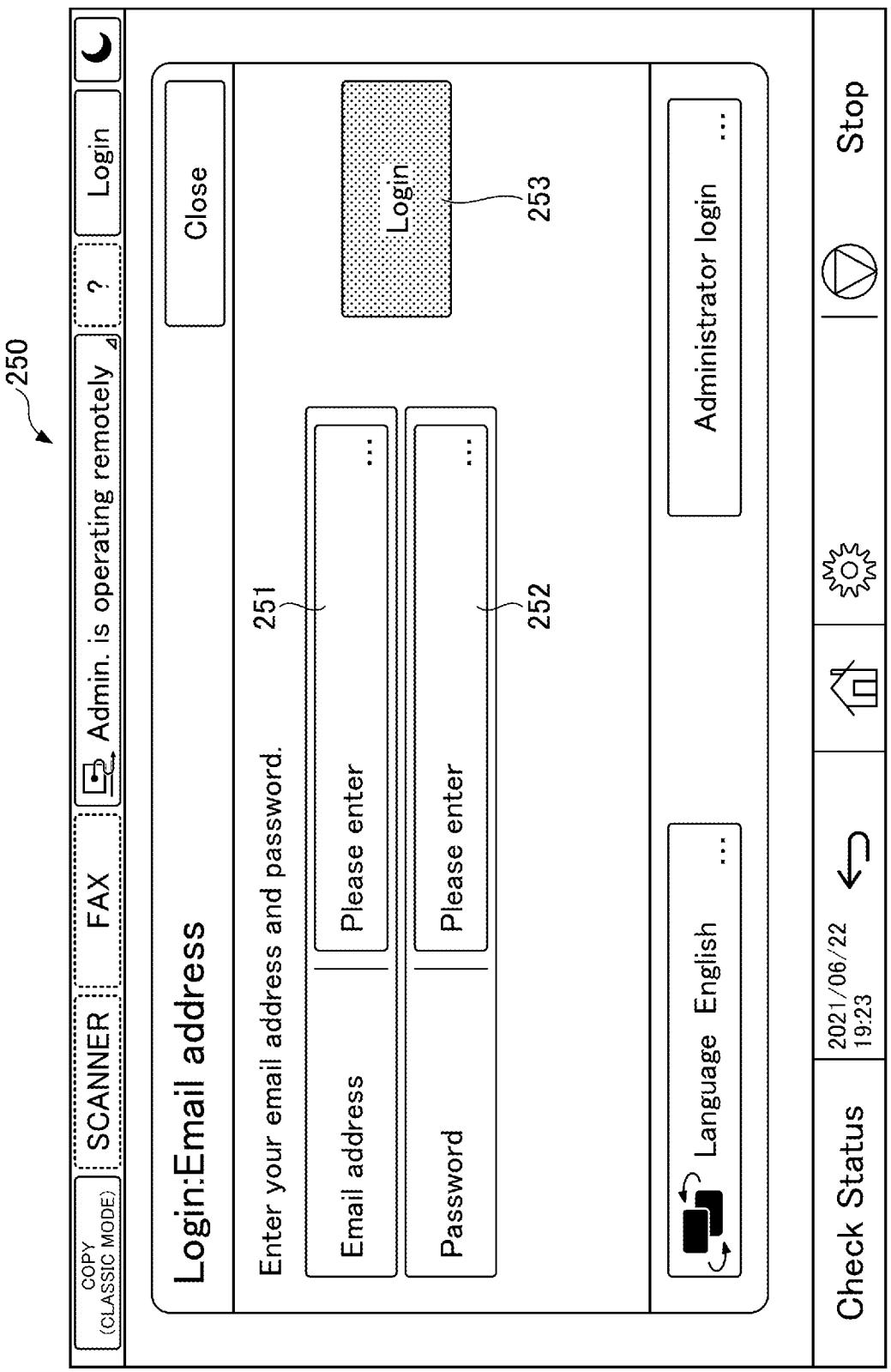
FIG. 10 is a diagram illustrating an example of a login screen displayed by the device when the authentication method is e-mail address and password according to an embodiment of the present invention.

FIG. 10 illustrates a login screen 250 displayed by the device 20 when the authentication method is the e-mail address and password. The login screen 250 of FIG. 10 includes an e-mail address field 251 and a password field 252. The user inputs the e-mail address in the e-mail address field 251, inputs the password in the password field 252, and presses a login button 253.

FIG. 11 illustrates a login screen 260 displayed by the device 20 when the authentication method is a tenant ID, user ID, and password. The login screen 260 of FIG. 11 includes a tenant ID field 261, a user ID field 262, and a password field 263. The user inputs the tenant ID in the tenant ID field 261, inputs the user ID in the user ID field 262, inputs the password in the password field 263, and presses a login button 264.

Figure 12:
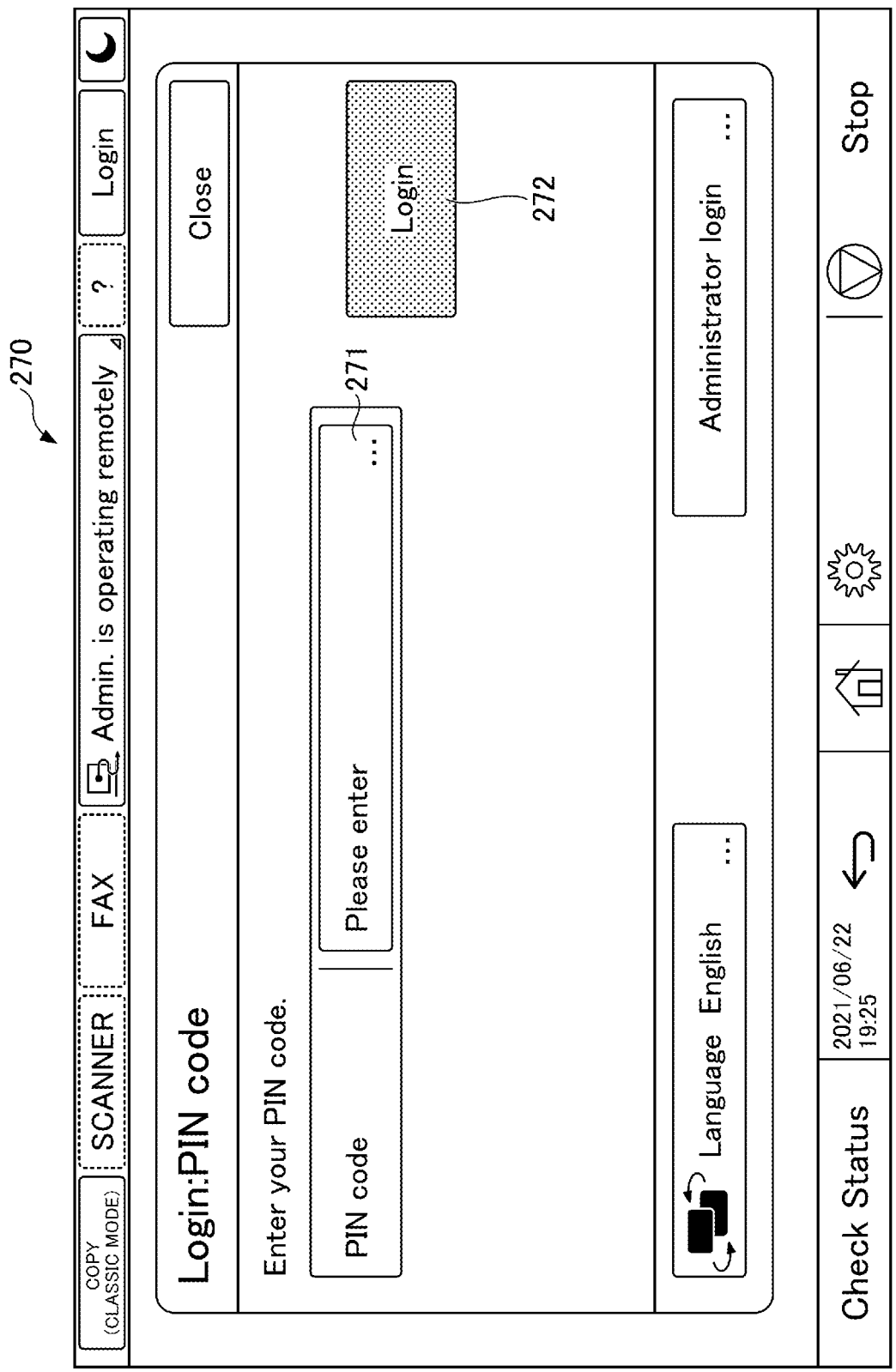
FIG. 12 is a diagram illustrating an example of a login screen displayed by a device when the authentication method is a PIN according to an embodiment of the present invention.

FIG. 12 illustrates a login screen 270 displayed by the device 20 when the authentication method is PIN. The login screen 270 of FIG. 12 includes a PIN field 271. The user inputs a PIN in the PIN field 271 and presses a login button 272.

Figure 13:
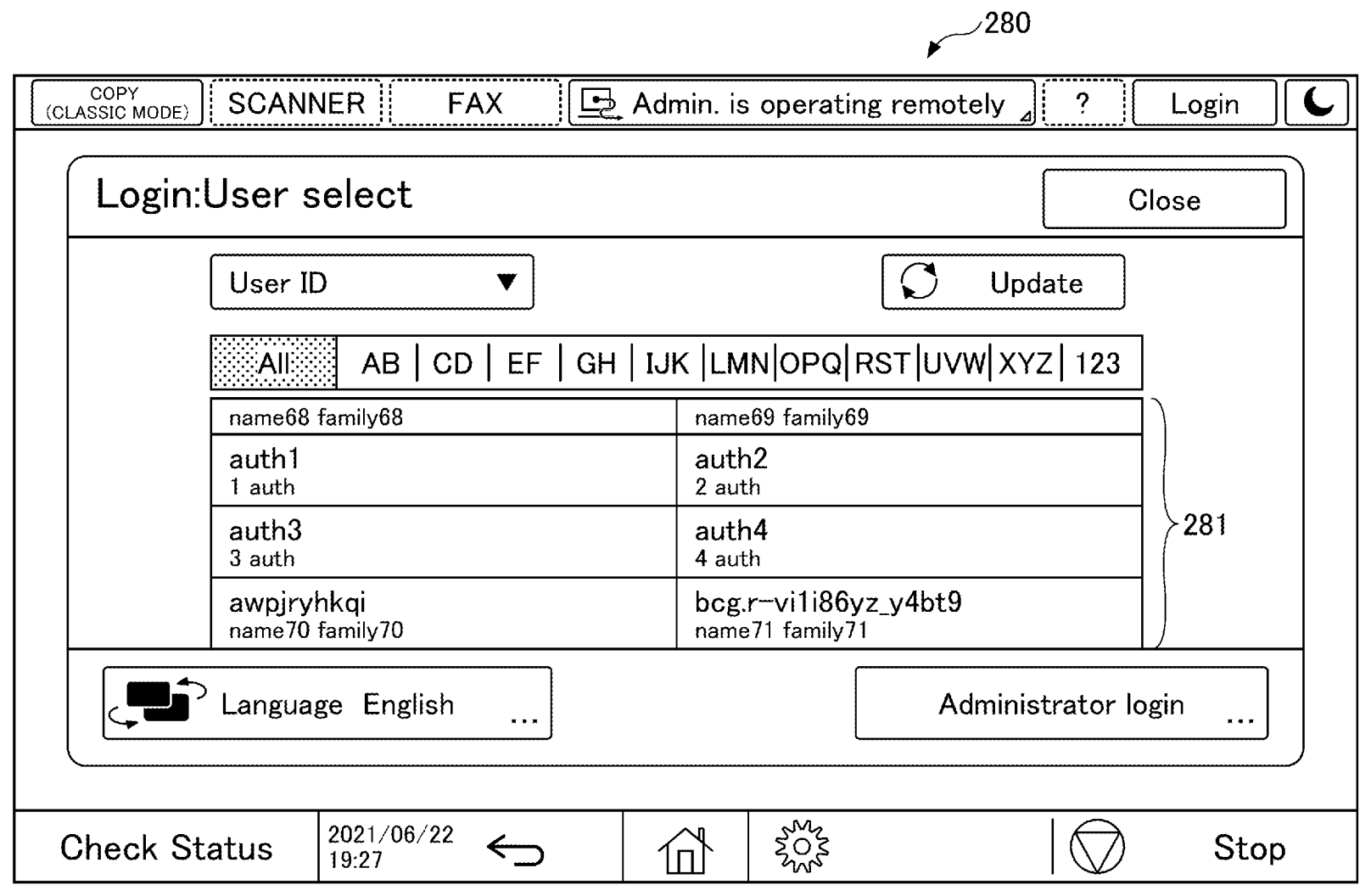

FIG. 13 illustrates a login screen 280 displayed by the device 20 when the authentication method is user select. The login screen 280 of FIG. 13 displays a user list 281. The user selects another user from the user list 281. Then, any one of the screens of FIGS. 10 to 12 is displayed, and the user can log in with the account information of the other user.

The login screens 250, 260, 270, and 280 illustrated in FIGS. 10 to 13 are displayed in accordance with the authentication method received from the information processing system 10 by the second display control unit 22 of the device 20. That is, the second display control unit 22 switches among the login screens 250, 260, 270, and 280 in accordance with the authentication method.

Figure 14:
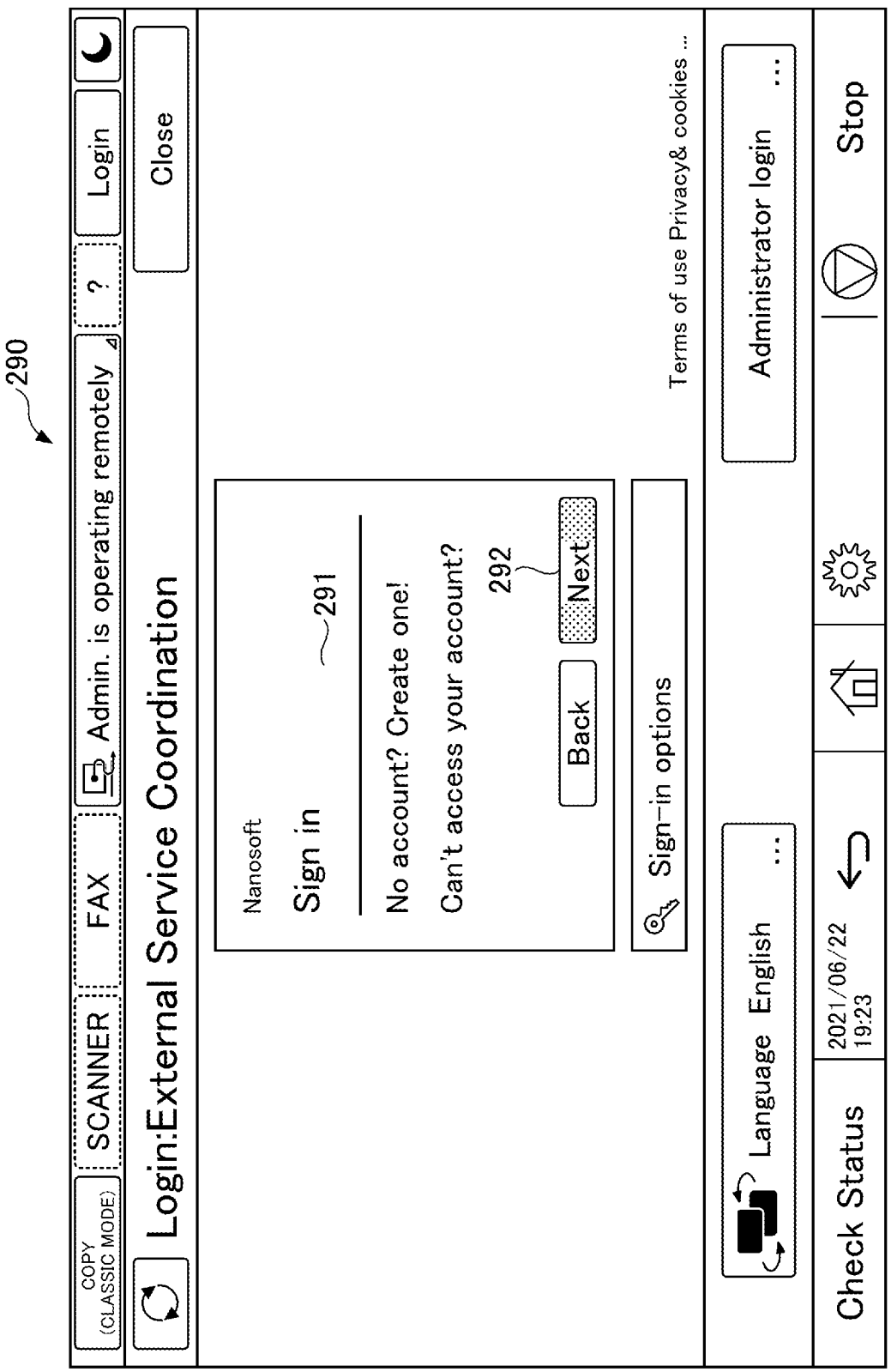
FIG. 14 is a diagram illustrating an example of a login screen displayed by the device when the authentication method is "authentication by external server" according to an embodiment of the present invention.

FIG. 14 illustrates a login screen 290 displayed by the device 20 when the authentication method is "authentication by external server". FIG. 14 is the same as the screen (a) in FIG. 1. The login screen 290 of FIG. 14 has a user ID field 291. The user inputs the user ID in the user ID field 291 and then presses a next button 292. By this operation, a password field is displayed in the login screen 290 (see the screen (b) in FIG. 1). The user inputs the password into the password field and presses the login button.

The login screen 290 of FIG. 14 is displayed based on the content of a web page received by the first display control unit 26 of the device 20 from the external server 40 when the device 20 connects to the external server 40 in accordance with the authentication method, and a display component retained by the second display control unit 22. Details will be described with reference to FIG. 15.

<Screen Configuration>

Figure 15:
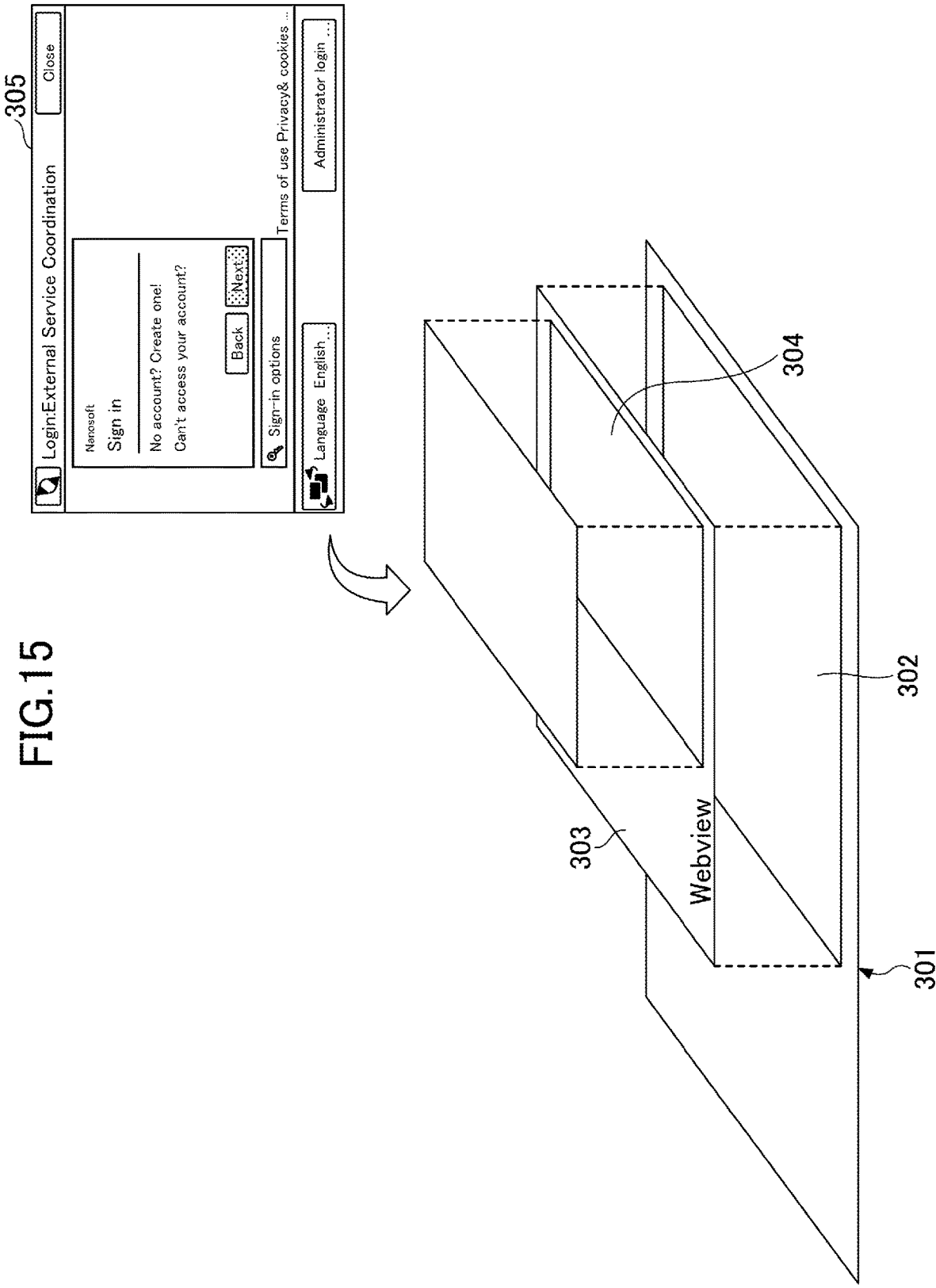
FIG. 15 is a diagram schematically illustrating the ranges where the authentication application and WebView perform rendering according to an embodiment of the present invention.

The login screen 290 as illustrated in FIG. 14 is generated by combining a device screen generated by the authentication application 71 and a WebView area generated by the WebView 72. FIG. 15 schematically illustrates the ranges in which the authentication application 71 and the WebView 72 perform rendering. The authentication application 71 (the second display control unit 22) renders a device screen 301. The authentication application 71 reserves a portion of the device screen 301 as a WebView area 302 in which the WebView 72 renders the content of a web page. The authentication application 71 may render something in the WebView area 302, but this will be overwritten by the WebView 72.

The WebView 72 (the first display control unit 26) forms a menu area 303 for displaying a menu or the like of a web page in the WebView area 302, and forms a content area 304 for displaying the content of a web page. In FIG. 15, a menu area 303 is provided, but the menu area 303 can be hidden. The WebView 72 displays a screen 305 based on screen information received from the external server 40, in the content area 304.

To the user, the device screen 301 and the WebView area 302 including the screen 305 appear to be one login screen, and, therefore, the user can perform an authentication operation without any discomfort.

<Operation Procedure>

Figure 16:
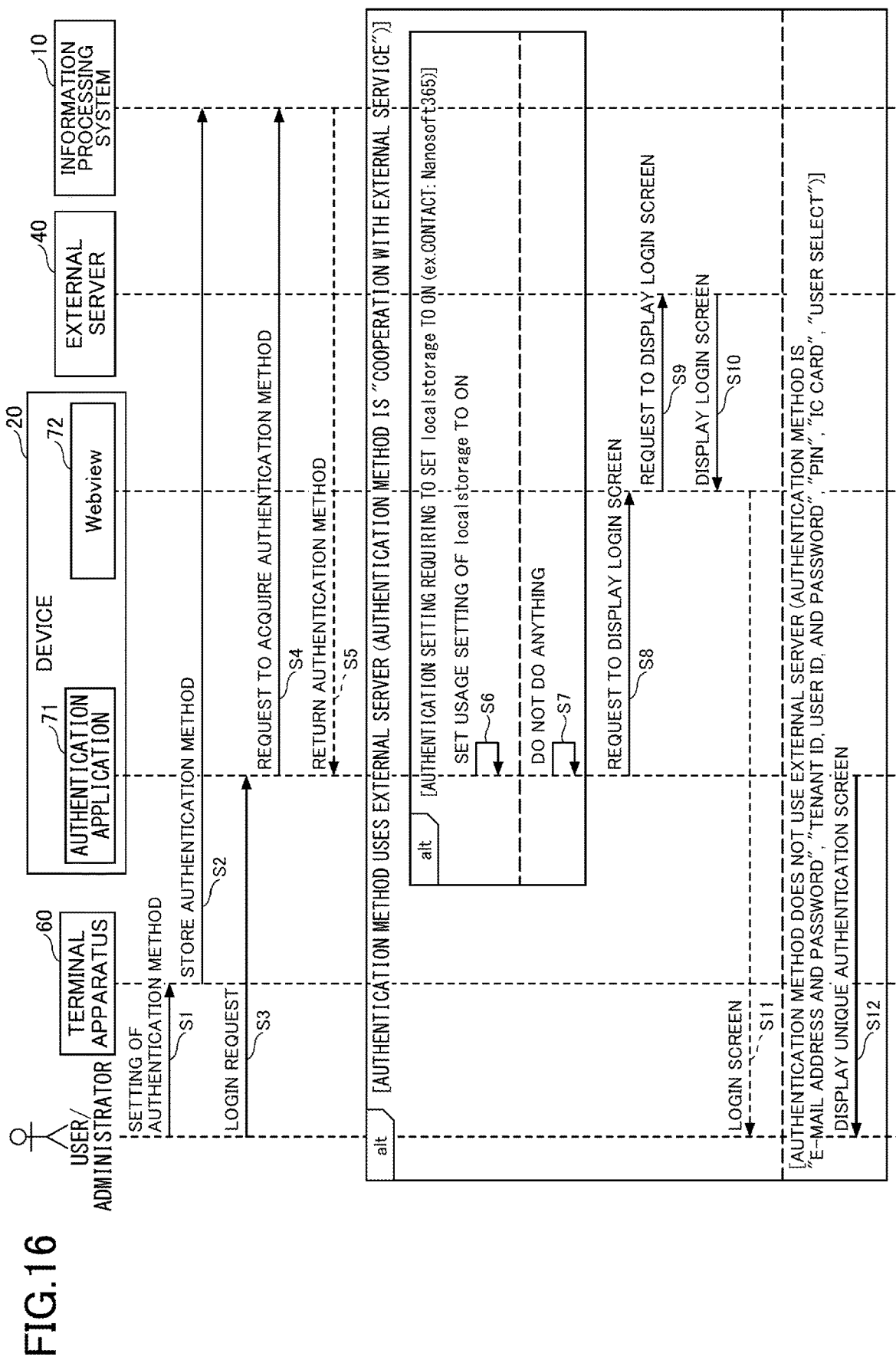
FIG. 16 is a sequence diagram of an example of displaying a login screen by an authentication application according to an embodiment of the present invention.

FIG. 16 is a sequence diagram of displaying a login screen by the authentication application 71 according to the present embodiment.

S1: The administrator connects the terminal apparatus 60 to the information processing system 10 in advance to display the authentication method setting screen 230.

S2: The administrator sets the authentication method on the authentication method setting screen 230. The operation receiving unit 63 of the terminal apparatus 60 receives the operation, and the communication unit 61 transmits the authentication method to the information processing system 10. The communication unit 11 of the information processing system 10 receives the authentication method, and the setting receiving unit 14 stores the authentication method in the authentication method storage unit 191.

S3: Next, the user inputs an operation to start login to the device 20. The operation receiving unit 25 of the device 20 receives the operation.

S4: The authentication application 71 transmits, by the communication unit 21, a request for acquiring the authentication method to the information processing system 10. The communication unit 21 transmits the device ID stored in the device 20, and, therefore, the information processing system 10 can identify the tenant.

S5: The communication unit 11 of the information processing system 10 receives the request to acquire the authentication method, acquires the authentication method associated with the tenant from the authentication method storage unit 191, and transmits the authentication method to the authentication application 71. When the authentication method is "authentication by external server" (cooperation by external server), the communication unit 11 may transmit the type of the external server and the connection destination URL to the device 20, to redirect the device 20 to the external server 40.

Figure 17:
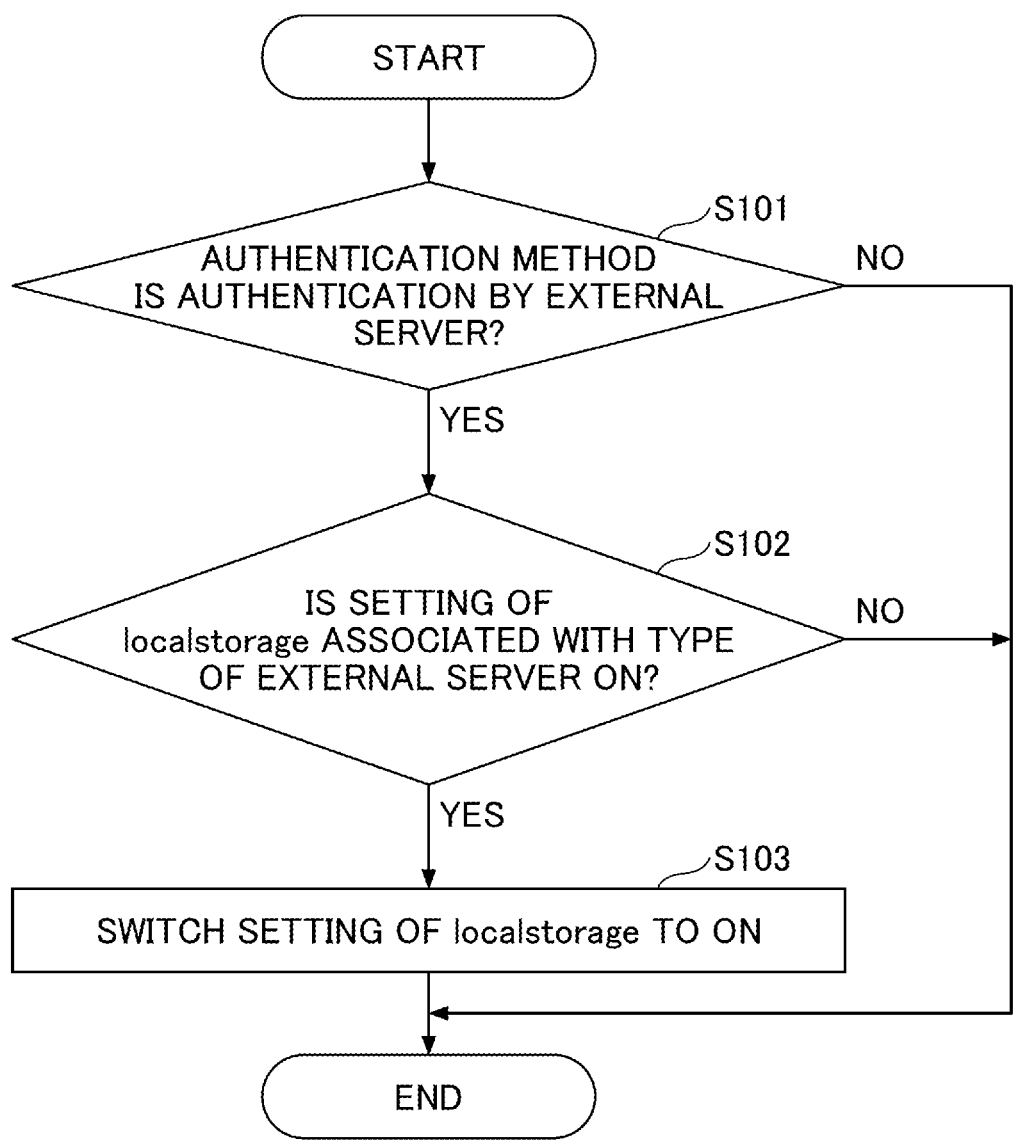

S6: When the authentication method is "authentication by external server", steps S6 to S10 are performed. First, the setting changing unit 23 refers to the setting information storage unit 24 to determine whether the setting of the local storage associated with the type of the external server 40 transmitted together with "authentication by the external server", is ON or OFF. When the setting of the local storage is ON, the setting changing unit 23 sets the setting of the local storage to ON (because the default is OFF). The details of this process are illustrated in FIG. 17.

S7: When the setting of the local storage associated with the type of the external server 40 is OFF, the setting changing unit 23 does not perform any operation (because the default is OFF). However, the setting changing unit 23 may set the setting of the local storage to OFF, just to be on the safe side.

S8: The authentication application 71 requests the WebView 72 to display the login screen (more precisely, to render the WebView area 302). The connection destination URL of the external server 40 is transferred to the WebView 72.

S9: The WebView 72 sends a request, by the communication unit 21, to the external server 40 to request for a login screen based on the specified connection destination URL. In order to switch the connection from the information processing system 10 to the external server 40, a single sign-on mechanism, such as OAUTH, may be used. This also allows the connection to be switched from the external server 40 to the information processing system 10.

S10: The communication unit 41 of the external server 40 transmits screen information of the login screen in response to the login screen request.

S11: The WebView 72 receives, by the communication unit 21, the screen information of the login screen of the external server 40, and the first display control unit 26 renders the content of the web page based on the screen information. The first display control unit 26 renders the WebView area 302 by arranging the content of the web page in the content area 304. The second display control unit 22 combines the device screen 301 generated by the authentication application 71 with the WebView area 302 rendered by the WebView 72 and displays the login screen 290.

The communication unit 21 of the device 20 transmits, to the external server 40, the account information input to the login screen 290, and the authentication unit 42 of the external server 40 determines whether the authentication is successful or unsuccessful based on the account information. When the authentication is successful, the communication unit 41 redirects the device 20 to the information processing system 10 and the information processing system 10 acquires an access token from the external server 40. When an access token is received at the device 20 from the information processing system 10, the device 20 can be used by a user.

S12: Step S12 is executed when the authentication method is other than "authentication by external server". Accordingly, the second display control unit 22 displays any of the login screens of FIGS. 10 to 13, in accordance with the authentication method. The communication unit 21 of the device 20 transmits the account information input to the login screen to the information processing system 10, and the authentication unit 12 of the information processing system 10 determines whether the authentication is successful or unsuccessful based on the account information. When the communication unit 11 transmits authentication successful to the device 20, the device 20 allows login and the user can use the device 20.

As described above, the authentication application 71 can set the setting of the local storage to ON according to an authentication method set in advance, and, therefore, the device 20 can display a login screen even when the authentication method is "authentication by external server".

FIG. 17 is an example of a flowchart illustrating a process in which the setting changing unit 23 changes the setting of the local storage to ON.

The setting changing unit 23 determines whether the authentication method received from the information processing system 10 is "authentication by external server" (S101). When the determination of step S101 is NO, the setting changing unit 23 does not perform any operation.

When the determination of step S101 is YES, the setting changing unit 23 determines whether the setting of the local storage associated with the type of the external server is ON (S102). When the determination of step S102 is NO, the setting changing unit 23 does not perform any operation.

When the determination of step S102 is YES, the setting changing unit 23 changes the setting of the local storage to ON (S103).

<Major Effects>

As described above, the device 20 according to the present embodiment changes the setting of local storage to ON in accordance with the authentication method set in advance, and, therefore, even when the authentication method is "authentication by external server", a particular screen can be displayed. Further, the number of authentication methods supported by the device 20 can be increased, thereby enabling authentication by using an authentication method that the user wishes to use.

<Other Applications>

While the information processing apparatus, the display method, and the recording medium according to an embodiment of the present invention has been described with reference to examples, various modifications and substitutions may be made thereto without departing from the spirit and scope of the present invention.

For example, the division of the blocks in the functional block diagram illustrated in FIG. 6 is an example, and a plurality of blocks may be implemented as one block, one block may be divided into a plurality of blocks, and/or some of the functions may be transferred to another block. The functions of multiple blocks with similar functions may be processed in parallel or by time division by a single piece of hardware or software.

Also, the apparatus group described in the examples are merely indicative of one of a plurality of computing environments for carrying out the embodiments disclosed herein. In some embodiments, the information processing system 10 includes a plurality of computing devices, such as server clusters. The plurality of computing devices are configured to communicate with each other via any type of communication link, including networks, a shared memory, and the like, and perform the processes disclosed herein.

Further, the information processing system 10 may be configured to share various combinations of disclosed processing steps, such as in FIG. 16. For example, a process executed by a predetermined unit may be executed by a plurality of information processing apparatuses included in the information processing system 10. The information processing system 10 may be organized into a single server apparatus or may be divided into a plurality of apparatuses.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

According to one embodiment of the present invention, an information processing apparatus that displays a screen for receiving an operation from a user, can be provided.

What is claimed is:

1. An image forming apparatus comprising:
   circuitry; and
   a memory storing computer-executable instructions that cause the circuitry to execute:
   registering a type of an external server in association with a setting of storing data in a web browser, the setting of storing data including ON and OFF with a default setting being OFF;
   requesting an information processing system connected via a network to transmit an authentication method and the type of the external server for the authentication method;
   receiving the authentication method and the type of the external server from the information processing system;
   in a case in which the authentication method is a first method using the external server,
      determining whether the setting of storing data is ON according to the setting registered for the received type of the external server,
      in response to determining that the setting of storing data is ON, changing the setting of storing data in the web browser from OFF to ON,
      in response to determining that the setting of storing data is OFF, leaving the setting of storing data OFF as the default setting, and
      displaying, by using the web browser, a screen for receiving an operation according to the authentication method, upon connecting to the external server; and
   in a case in which the authentication method is a second method other than the first method using the external server,
      displaying an authentication screen unique to the image forming apparatus.

2. The image forming apparatus according to claim 1, wherein
   the changing includes changing the setting of the web browser in response to determining that the received authentication method is the first method of using the external server, and
   the image forming apparatus includes a setting of changing the setting of the web browser for the received type of the external server.

3. The image forming apparatus according to claim 1, wherein in response to determining that the received authentication method is the second method, e-mail address and password; tenant ID, user ID, and password; integrated circuit (IC) card; or Personal Identification Number (PIN) are displayed on the authentication screen unique to the image forming apparatus.

4. The image forming apparatus according to claim 1, wherein the circuitry is further caused to execute:
   operating an authentication application for performing authentication in the image forming apparatus,
   calling, by the authentication application, the web browser in response to determining that the received authentication method is the first method of using the external server, and
   displaying a combined screen created by combining a screen relating to the authentication rendered by the web browser with a screen rendered by the authentication application.

5. A display method performed by an image forming apparatus, the display method comprising:
   registering a type of an external server in association with a setting of storing data in a web browser, the setting of storing data including ON and OFF with a default setting being OFF;
   requesting an information processing system connected via a network to transmit an authentication method and the type of the external server for the authentication method;
   receiving the authentication method and the type of the external server from the information processing system;
   in a case in which the authentication method is a first method using the external server,
      determining whether the setting of storing data is ON according to the setting registered for the received type of the external server,
      in response to determining that the setting of storing data is ON, changing the setting of storing data in the web browser from OFF to ON,
      in response to determining that the setting of storing data is OFF, leaving the setting of storing data OFF as the default setting, and
      displaying, by using the web browser, a screen for receiving an operation according to the authentication method, upon connecting to the external server; and
   in a case in which the authentication method is a second method other than the first method using the external server,
      displaying an authentication screen unique to the image forming apparatus.

6. A non-transitory computer-readable recording medium storing a program that causes a computer to execute a process performed in an image forming apparatus, the process comprising:
   registering a type of an external server in association with a setting of storing data in a web browser, the setting of storing data including ON and OFF with a default setting being OFF;
   requesting an information processing system connected via a network to transmit an authentication method and the type of the external server for the authentication method;
   receiving the authentication method and the type of the external server from the information processing system;
   in a case in which the authentication method is a first method using the external server,
      determining whether the setting of storing data is ON according to the setting registered for the received type of the external server,
      in response to determining that the setting of storing data is ON, changing the setting of storing data in the web browser from OFF to ON,
      in response to determining that the setting of storing data is OFF, leaving the setting of storing data OFF as the default setting, and
      displaying, by using the web browser, a screen for receiving an operation according to the authentication method, upon connecting to the external server; and in a case in which the authentication method is a second method other than the first method using the external server,
displaying an authentication screen unique to the image forming apparatus.

* * * * *